United States Patent Office 3,297,630
Patented Jan. 10, 1967

3,297,630
STABILIZED POLYSULFIDE POLYMER BASED COMPOSITIONS CONTAINING ORGANO - METALLIC TIN COMPOUNDS
Joseph J. Giordano, Trenton, N.J., assignor to Thiokol Chemical Corporation, Bristol, Pa., a corporation of Delaware
No Drawing. Filed Sept. 25, 1963, Ser. No. 311,327
13 Claims. (Cl. 260—45.75)

This invention relates to liquid polysulfide polymer based compositions which have been stabilized against the effects of ultraviolet light. More specifically, it relates to curable liquid polysulfide polymer based sealant and caulking compositions which have been stabilized against adhesive degradation caused by exposure of the cured composition, under various application conditions, to ultraviolet light, by the addition thereto of compounds having the structure:

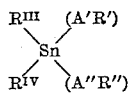

wherein $R^{III}$ and $R^{IV}$ are the same or different lower alkyl groups having about 2 to 6 carbon atoms, $R'$ and $R''$ are the same or different alkyl or alkenyl groups having about 1 to 20 carbon atoms and $A'$ and $A''$ are each either —O— or

To be universally applicable, a polysulfide polymer based sealant or caulking composition must be amenable to both indoor and outdoor uses. The outdoor applications pose the greatest challenge to the usefulness and stability of such compositions since the conditions encountered outdoors generally pose more and greater problems than those presented by indoor applications. Particularly, certain portions of the electromagnetic spectrum given off by the sun have been found to substantially interfere with the adhesive performance properties of polysulfide polymer based sealant and caulking compositions where the application requires that the cured composition afford lasting adhesion to one or more substrate materials.

The ultraviolet portion of the radiation given off by the sun, which portion extends from a wavelength of about 255 millimicrons to the visible portion of the electromagnetic spectrum which starts at a wavelength of about 410 millimicrons, is particularly harmful to the adhesive properties of polysulfide polymer based sealant or caulking compositions particularly where lead dioxide is used in these compositions as the polysulfide polymer curing agent. This adhesion failure is even more likely to occur when the substrate to which the sealant or caulking composition is being bonded to is glass.

An object of the present invention, therefore, is to provide a curable liquid polysulfide polymer based sealant or caulking composition which has increased stability against ultraviolet degradation of the adhesion properties of the cured composition.

A further object of the present invention is to provide a curable, liquid polysulfide polymer based sealant or caulking composition which contains an ultraviolet light stabilizer which does not substantially change the desired physical properties of the cured composition.

Previous attempts to solve the problem of ultraviolet light degradation of the adhesion properties of polysulfide polymer based sealants and caulking compositions led to the testing of numerous materials such as barium-cadmium complexes, organic lead salts, organic zinc complexes and barium-sodium organic complexes. None of these additives produced the desired results.

It has now been unexpectedly found, according to the present invention, that by the addition of from about 0.5 to 5.0 parts by weight of at least one of the tin compounds of the present invention to 100 parts by weight of liquid polysulfide polymer, the adhesive life of the thus modified sealant or caulking composition to a substrate, particularly glass, can be substantially increased. The organo tin compounds of the present invention are high boiling liquids or solids which when admixed in the above proportions with a liquid polysulfide polymer based sealant or caulking composition, which is subsequently cured, do not substantially change the physical characteristics of the cured composition.

As noted above the tin compounds used in accordance with the teachings of the present invention are those having the structure

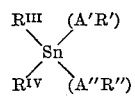

wherein $R^{III}$ and $R^{IV}$ are the same or different lower alkyl groups having about 2 to 6 carbon atoms, $R'$ and $R''$ are the same or different alkyl or alkenyl groups having about 1 to 20 carbon atoms and $A'$ and $A''$ are each either —O— or

Compounds of this type include diethyl tin dilaurate, dibutyl tin dilaurate, dibutyl tin diacetate, diethoxy dibutyl tin, dibutyl tin distearate, diethyl tin dioleate and monoethyl monobutyl tin dilaurate. The preferred of these compounds are those in which $R'$ and $R''$ are the longer chained alkyl or alkenyl radicals having about 10 to 20 carbon atoms such as the laurate radical.

The liquid polysulfide polymers employed in the present invention are described in U.S. Patent 2,466,963 and are essentially relatively low molecular weight, mercaptan-terminated, polymers having recurring disulfide linkages and are produced, as described in that patent, by splitting high molecular weight, solid polysulfide polymers. These solid, high molecular weight polymers usually have incorporated therein a small amount, about 0.1 to 2 mol percent, of a crosslinking agent having a halide functionality of three or more. The resulting liquid polymer may be represented by the formula $HS(R-S-S-)_nRSH$ where R is a hydrocarbon, oxahydrocarbon or thiahydrocarbon radical such as the ethyl formal radical

the butyl formal radical

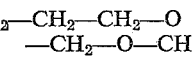

the ethyl ether radical (—CH₂—CH₂—O—CH₂—CH₂—)
and the butyl ether radical

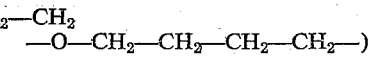

and $n$ may vary about from 4 to 23.

Curing of the sealant or caulking composition according to the present invention is effected using conventional curing agents and techniques for liquid polysulfide polymer based compositions. Oxidizing agents, generally, may be utilized as the curing agents. Exemplary of the many curing systems that may be used is a curing formulation or paste comprising about 50 parts by weight of lead dioxide, as the curing agent, and about 50 parts by weight of dibutyl phthalate which acts as a plasticizer. The curing paste is added to the sealant or caulking composition in the ratio of from about 6 to about 30 parts by weight and preferably 15 parts by weight of curing paste to about 100 parts by weight of the liquid polysulfide polymer in the sealant composition. This lead dioxide curing system is well known to the art and offers numerous advantages.

Formulation of the liquid polysulfide polymer and the organo tin compounds with fillers, extenders, pigments, cure retarders or accelerators, plasticizers, adhesion additives and other adjuvants known to the art, may be readily varied to meet the needs of a particular application.

In addition to the known advantages of polysulfide polymer based sealant or caulking compositions, such as high solvent and chemical resistance, dimensional stability, structural strength and electrical properties, the compositions modified with the organo tin compounds described above, according to the present invention, show increased stability to weather degradation and particularly to ultraviolet light degradation of the adhesive properties of the cured composition. This feature is especially advantageous when the polysulfide polymer based compositions are to be used outdoors in such applications as automotive windshield sealants, curtain wall construction and marine deck caulking.

Although the use of the stabilized compositions of the present invention are particularly useful when the substrate to which they are to be applied to is glass, they may also be advantageously used with other construction element substrates such as concrete, wood, as well as metals, including lead, iron, steel, aluminum, copper and zinc.

The following examples are merely illustrative of the scope of the present invention and are not intended as a limitation thereof.

*Example 1*

A stock supply of the following polysulfide polymer based composition was prepared:

| | Parts by weight |
|---|---|
| Liquid polysulfide polymer having essentially the formula $HS(C_2H_4-O-CH_2-O-C_2H_4-S-S-)_{23}$ $C_2H_4-O-CH_2-O-C_2H_4SH$ and containing about 4 mol percent of trichloropropane | 100 |
| Witcarb RC—(precipitated calcium carbonate) | 20 |
| Titanox RA 50—(titanium pigment) | 20 |
| Hi-Sil 233 (hydrated silica) | 3 |
| Calcium stearate | 1 |
| Stearic acid | 1 |
| Durez 10694 (phenolic adhesion additive) | 5 |

To three separate samples of the above formulation was added 1, 3 and 5 parts by weight, respectively, of dibutyl tin dilaurate per 100 parts by weight of polysulfide polymer. An additional sample of the stock composition, which did not contain dibutyl tin dilaurate, was set aside as a control. A curing paste of the following formulation was then prepared and 15 parts by weight of the paste was added to each of the four samples prepared above, per 100 parts by weight of polysulfide polymer contained therein:

| | Parts by weight |
|---|---|
| Lead dioxide | 50 |
| Stearic acid | 5 |
| Dibutyl phthalate | 45 |

Small rectangular shaped beads of each of the four compositions were then applied to the surface of clean dry glass plates and the thus coated plates were then air cured for one week at room temperature and then placed in an accelerated weathering testing device. The construction and operation of this weathering device is detailed in ASTM Test No. E42-57. The device consists essentially of a carbon arc and filter system which gives off ultraviolet and visible light of an intensity which approximates Noon June Sunlight and a closure in which the test material is positioned and subjected to both continuous exposure to the ultraviolet light emitted from the arc and intermittent exposure to water of a known temperature, purity and pressure. An exposure of 300 hours in this accelerated weathering device is generally equivalent to an outdoor exposure of one year in the central portion of the North Temperature Zone. The test result is reported in hours to adhesion failure which is determined by attempting to peel the sample from the glass at intervals of from about 60–75 hours. If the sample is easily peeled from the plate, adhesive failure is reported; if the sample of the polymer composition ruptures in the attempt to peel the sample from the plate, leaving a portion of the polymer adhering to the plate, the adhesion is considered positive and no failure reported. The following table gives the test results.

| | Hours to failure |
|---|---|
| Control sample | 429 |
| Polysulfide polymer based sealant composition: | |
| Modified with 1 part dibutyl tin dilaurate | 705 |
| Modified with 3 parts dibutyl tin dilaurate | 1269 |
| Modified with 5 parts dibutyl tin dilaurate | 1269 |

*Example 2*

In this example a different sealant formulation was used; otherwise the preparation of the sealant composition tested, the addition of the dibutyl tin dilaurate thereto and the curing and testing procedures are the same as were used and described in Example 1. The following sealant formulation was prepared:

| | Parts by weight |
|---|---|
| Liquid polysulfide polymer having essentially the formula $HS(C_2H_4-O-CH_2-O-C_2H_4-S-S-)_{23}$ $C_2H_4-O-CH_2-O-C_2H_4SH$ and containing about 2 mol percent of trichloropropane | 100 |
| Witcarb RC (precipitated calcium carbonate) | 20 |
| Titanox RA 50 (titanium pigment) | 20 |
| Hi-Sil 233 (hydrated silica) | 3 |
| Calcium stearate | 1 |
| Stearic acid | 1 |
| Durez 10694 (phenolic adhesion additive) | 5 |

Test results of the above sealant base modified by the addition thereto of 1, 3 and 5 parts by weight of dibutyl tin dilaurate per 100 parts by weight of polymer and cured and tested as in Example 1 were:

| | Hours to adhesion failure |
|---|---|
| Control sample | 306 |
| Sealant composition containing: | |
| 1 part dibutyl tin dilaurate added | 643 |
| 3 parts dibutyl tin dilaurate added | [1]1207 |
| 5 parts dibutyl tin dilaurate added | [1]1207 |

[1] Test discontinued at this point—adhesion still good.

I claim:

1. A curable polymer based sealant composition comprising liquid mercaptan terminated polysulfide polymer, curing agent for said polysulfide polymer and, as an ultraviolet light stabilizer, at least one compound having the structure

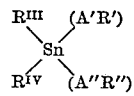

in which $R^{III}$ and $R^{IV}$ are lower alkyl groups having about 2 to 6 carbon atoms, R' and R" are selected from the group consisting of alkyl and alkenyl groups having about 1 to 20 carbon atoms and A' and A" are selected from the group consisting of —O— and

groups.

2. A composition as in claim 1 which comprises about 0.5 to 5 parts by weight of said stabilizer per 100 parts by weight of polysulfide polymer therein.

3. A composition as in claim 1 which comprises, per 100 parts by weight of polysulfide polymer therein, about 0.5 to 5 parts by weight of said stabilizer and about 3 to 15 parts by weight of lead dioxide as the curing agent for said polysulfide polymer.

4. A composition as in claim 3 in which said stabilizer is dibutyl tin dilaurate.

5. A sealant composition comprising, in weight ratio,
(a) 100 parts by weight of polymer having essentially the structure HS$(R-S-S)_n$RSH in which $n$ is a whole number of about 4 to 23 and R is selected from the group consisting of hydrocarbon, oxahydrocarbon and thiahydrocarbon radicals,
(b) about 3 to 15 parts by weight of lead dioxide and
(c) about 0.5 to 5 parts by weight of at least one stabilizer compound having the structure

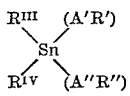

in which $R^{III}$ and $R^{IV}$ are lower alkyl groups having about 2 to 6 carbon atoms, R' and R" are selected from the group consisting of alkyl and alkenyl groups having about 1 to 20 carbon atoms and A' and A" are selected from the group consisting of —O— and

groups.

6. A composition as in claim 5 in which at least one of said stabilizer compounds is dibutyl tin dilaurate.

7. An article comprising a construction element substrate having adhesively bonded thereto a cured composition formed from a curable polymer based composition comprising, in weight ratio,
(a) 100 parts by weight of polymer having essentially the structure HS$(R-S-S)_n$RSH in which $n$ is a whole number of about 4 to 23 and R is selected from the group consisting of hydrocarbon, oxahydrocarbon and thiahydrocarbon radicals,
(b) about 3 to 15 parts by weight of lead dioxide and
(c) about 0.5 to 5 parts by weight of at least one stabilizer compound having the structure

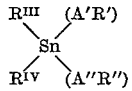

in which $R^{III}$ and $R^{IV}$ are lower alkyl groups having about 2 to 6 carbon atoms, R' and R" are selected from the group consisting of alkyl and alkenyl groups having about 1 to 20 carbon atoms and A' and A" are selected from the group consisting of —O— and

groups.

8. An article as in claim 7 in which at least one of said stabilizer compounds is dibutyl tin dilaurate.

9. An article as in claim 8 in which said substrate is glass.

10. A process which comprises applying to a construction element substrate a curable sealant composition and curing said sealant composition thereon so as to adhesively bond said sealant composition to said substrate, said sealant composition comprising, in weight ratio,
(a) 100 parts by weight of liquid mercaptan terminated polysulfide polymer,
(b) about 3 to 15 parts by weight of curing agent for said polysulfide polymer, and
(c) about 0.5 to 5 parts by weight of at least one stabilizer compound having the structure

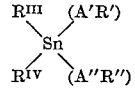

in which $R^{III}$ and $R^{IV}$ are lower alkyl groups having 2 to 6 carbon atoms, R' and R" are selected from the group consisting of alkyl and alkenyl groups having about 1 to 20 carbon atoms and A' and A" are selected from the group consisting of —O— and

groups.

11. A process as in claim 10 in which the polysulfide polymer curing agent employed is lead dioxide.

12. A process as in claim 11 in which said substrate is glass.

13. A process as in claim 12 in which at least one of said stabilizer compounds is dibutyl tin dilaurate.

References Cited by the Examiner

UNITED STATES PATENTS

| | | | |
|---|---|---|---|
| 2,466,963 | 4/1949 | Patrick et al. | 260—79.1 |
| 3,119,782 | 1/1964 | Fram | 177—124 |
| 3,167,527 | 1/1965 | Hechenbleikner et al. | 260—45.75 |

DONALD E. CZAJA, *Primary Examiner.*

LEON J. BERCOVITZ, *Examiner.*

G. W. RAUCHFUSS, *Assistant Examiner.*